United States Patent
Kazaoka

(10) Patent No.: US 6,543,476 B2
(45) Date of Patent: Apr. 8, 2003

(54) RELIEF VALVE FOR AN OIL PUMP

(75) Inventor: Shinji Kazaoka, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/790,502

(22) Filed: Feb. 23, 2001

(65) Prior Publication Data

US 2001/0022195 A1 Sep. 20, 2001

(30) Foreign Application Priority Data

Feb. 29, 2000 (JP) .......................... 2000-054241

(51) Int. Cl.[7] .................................... F16K 15/02
(52) U.S. Cl. ................................ 137/538; 137/565.35
(58) Field of Search .......................... 137/538, 115.13, 137/565.35, 540; 417/307, 310, 311

(56) References Cited

U.S. PATENT DOCUMENTS

| 637,782 | A | * | 11/1899 | Hemenway | ............. | 137/540 X |
|---|---|---|---|---|---|---|
| 764,642 | A | * | 7/1904 | Stenwall | ............. | 137/538 |
| 1,128,077 | A | * | 2/1915 | Taylor | ............. | 137/538 |
| 1,363,623 | A | * | 12/1920 | Smith | ............. | 137/538 X |
| 1,443,675 | A | * | 1/1923 | Bowler | ............. | 137/540 |
| 1,844,668 | A | * | 2/1932 | McGregor | ............. | 137/538 |
| 2,011,333 | A | * | 8/1935 | Clifton | ............. | 137/53 |
| 2,129,963 | A | * | 9/1938 | Rayfield | ............. | 137/540 X |
| 2,679,858 | A | * | 6/1954 | Kemp | ............. | 137/382 |
| 3,092,133 | A | * | 6/1963 | Clark | ............. | 137/220 |
| 3,363,646 | A | * | 1/1968 | Foreman | ............. | 137/540 |
| 3,490,593 | A | * | 1/1970 | Pohoski | ............. | 210/130 |
| 3,580,275 | A | * | 5/1971 | Hanson et al. | ............. | 137/516.29 |
| 3,720,208 | A | * | 3/1973 | Aldrich et al. | ............. | 128/201.27 |
| 4,161,189 | A | * | 7/1979 | Mueller, Jr. | ............. | 137/514.7 |
| 4,256,137 | A | * | 3/1981 | Launay | ............. | 137/496 |
| 4,739,612 | A | * | 4/1988 | Stockbridge | ............. | 60/39.091 |
| 4,883,083 | A | * | 11/1989 | Fisher et al. | ............. | 137/110 |
| 5,054,518 | A | * | 10/1991 | Rancani | ............. | 137/516.27 |
| 5,195,494 | A | * | 3/1993 | Tuckey | ............. | 123/514 |
| 5,395,518 | A | * | 3/1995 | Gulsvig | ............. | 210/132 |
| 6,224,754 | B1 | * | 5/2001 | Schiavon et al. | ............. | 210/130 |

FOREIGN PATENT DOCUMENTS

JP          5-332116         12/1993

* cited by examiner

*Primary Examiner*—John Rivell

(57) ABSTRACT

A relief valve for regulating discharged oil pressure of an oil pump at a predetermined level comprises a cylinder including a bore therein and relief grooves formed symmetrically relatively to an axial center of the bore, while each of the relief grooves has a respective opening to an inner peripheral portion of the bore; a valve body disposed in the cylinder so as to be slidably moved in the bore in response to the discharged oil pressure supplied into the bore at one side of the valve body; a spring provided in the other side of the valve body constantly urging the valve body toward the one side of the valve body so as to close the openings of the relief grooves by the valve body; and an adjusting means for adjusting a change rate of an opening area of the relief grooves relatively to one slide movement of the valve body against the force of the spring so that the change rate of the opening area at the beginning of slide movement of the valve body is smaller than that at the end of the slide movement of the valve body.

12 Claims, 2 Drawing Sheets

RELIEF VALVE FOR AN OIL PUMP

BACKGROUND OF THE INVENTION

1. Field of the Invention

This invention relates to a relief valve for an oil pump, and more particularly to a relief valve for regulating discharged oil pressure of an oil pump.

2. Description of Related Arts

A conventional relief valve for an oil pump is hereinafter described referring to FIGS. 6 and 7. The relief valve for the oil pump (not shown) comprises a valve cylinder 231 including a valve bore 232 therein, a valve body 240 disposed slidably movable in the valve bore 232 in response to discharged oil pressure supplied by the oil pump, an inlet bore 233 for communicating between the valve bore 232 and a discharged port (not shown) of the oil pump formed opposite to the one side of the valve body 240, a spring (not shown) provided at the other side of the valve body 240 (right side in FIG. 6) so as to always urge the valve body 240 toward the inlet bore 233 (left side in FIG. 6) and a pair of relief grooves 234 having a respective openings formed in the inner peripheral of the valve bore 232.

When the discharged oil pressure of the oil pump is higher than the predetermined pressure level, the valve body 240 receiving the discharged oil pressure, slides against an urging force of the spring in the valve bore 232. So the opening area of the pair of relief grooves becomes large. When the discharged oil pressure is lower than the predetermined pressure level, the valve body 240 is not able to slide against the urging force of the spring. So the opening area of the pair of relief grooves is closed by the valve body 240. Namely, the valve body 240 regulates the discharged oil pressure to be maintained at the predetermined pressure level by opening and closing of the pair of relief grooves 234 relative to the valve body 240.

According to the above relief valve, the respective opening of the pair of relief grooves is formed perpendicular to an axial center line of the valve bore 232 and extending toward the other side of the valve body 240. When the discharged oil pressure exceeds the predetermined pressure level, a change rate of the opening area of the pair of relief grooves 234 relative to a slide movement of the valve body against the force of the spring becomes large rapidly. This causes a pressure fluctuation of the discharged oil by opening and closing of the relief bores 234, which leads to a vibration of the valve body 240, an unusual sound or an eccentric wearing on the valve body 240, and an invasion of foreign materials between the relief bore 234 and the valve body 240.

Another conventional relief valve is disclosed in a Japan Patent Laid-open Publication H05-332116 (JP 05332116 A). This relief valve is able to reduce the pressure fluctuation of the discharged oil because the opening of the relief bore is formed along an inner peripheral surface of a valve bore, having a convex portion toward one side of a valve body.

According to the relief valve, the discharged oil pressure in the valve bore is applied concentrically to the single relief bore, when the single relief bore is opened to the inner peripheral surface of the valve bore. This may cause the discharged oil pressure imbalance within the valve bore, which leads to an eccentric wearing on the valve body by being forced to move into the single relief bore.

SUMMARY OF THE INVENTION

Accordingly, it is an object of the present invention to provide an improved relief valve for an oil pump. It is another object of the present invention to provide an improved relief valve for an oil pump that obviates the above conventional drawbacks. It is a further object of the present invention to provide a simple relief valve for an oil pump to prevent a valve body from vibration and an eccentric wearing.

To achieve the above objects, relief valve for regulating discharged oil pressure of an oil pump at a predetermined level according to the invention, comprises a cylinder including a bore therein and relief grooves formed symmetrically relatively to an axial center of the bore, while each of the relief grooves has a respective opening to an inner peripheral portion of the bore, a valve body disposed in the cylinder so as to be slidably moved in the bore in response to the discharged oil pressure supplied into the bore at one side of the valve body, a spring provided in the other side of the valve body to always urge the valve body toward the one side of the valve body so as to close the openings of the relief grooves by the valve body, and adjusting means for adjusting a change rate of an opening area of the relief grooves relatively to the slide movement of the valve body against the urging force of the spring so that the change rate at the beginning of slide movement of the valve body is smaller than that at the end of the slide movement of the valve body.

According to the above relief valve, the change rate of the opening area of the relief grooves opened to the bore relatively to the slide movement of the valve body becomes smaller at the beginning than that at the end of the slide movement.

Accordingly, the adjusting means prevents changing the opening area of the relief grooves rapidly. Therefore it is possible to prevent vibration of the valve body, generating undesired sound, and an eccentric wearing due to the invasion of foreign materials between the pair of relief grooves and the valve body. Since the pressure balance within the bore can be kept at the opening operation due to the symmetrically provided relief bores, the pressure is equally applied to the valve body, which can prevent the eccentric wearing thereof.

BRIEF DESCRIPTION OF THE DRAWINGS

These and other objects of the invention will become more apparent from the following embodiments of the invention with reference to the attached drawings in which.

DESCRIPTION OF THE PREFERRED EMBODIMENT

Figure 1:
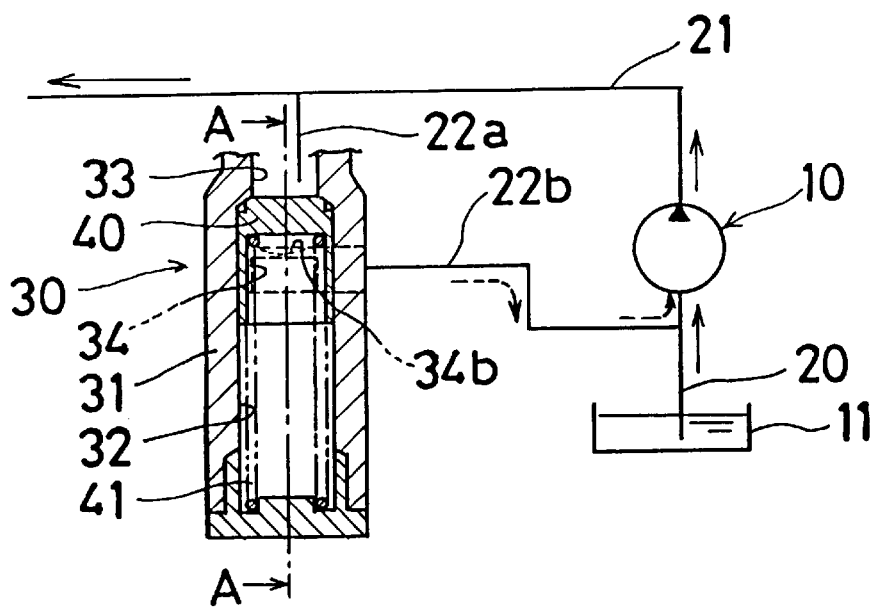
FIG. 1 shows a relief valve of a first embodiment of the present invention.
Figure 2:
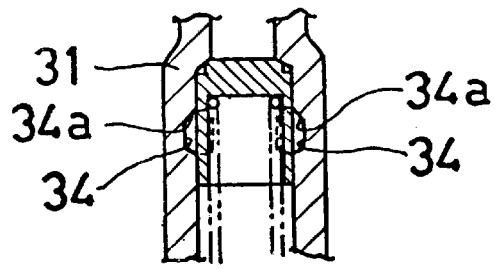
FIG. 2 shows a cross sectional view of a relief valve taken along the line A—A of FIG. 1.

The first embodiment of this invention is hereinafter described as follows referring to FIGS. 1 and 2. In FIG. 1 an oil pump 10 includes a pump housing (not shown) accommodating an inner rotor (not shown) rotated by the rotation of a crank shaft (not shown) of an engine (not shown) and an outer rotor (not shown) eccentrically disposed with the inner rotor. The outer rotor is driven by the inner rotor. So volumes formed between the inner rotor and outer rotors is changed by the rotation of the rotors. Therefore the oil pump 10 sucks an (operation) oil through an inlet conduit 20 and discharges the oil through an outlet conduit 21.

The discharged oil of the oil pump 10 is introduced to a hydraulic apparatus such as a variable valve timing system (not shown), a portion to be lubricated such as a bearing and a portion to be cooled such as a cylinder and a piston. The discharged oil supplied to the above apparatus and portions returns to an oil pan 11 through a drain conduit (not shown).

A relief conduit 22a and a return conduit 22b are branched from the outlet conduit 21 and connected with the inlet conduit 20 as viewed in FIG. 1. A relief valve 30 is disposed between the relief conduit 22a and the return conduit 22b and hydraulically connected thereto. The relief valve 30 comprises a valve cylinder 31, a valve bore 32 defined by the valve cylinder 31 and a valve body 40 slidably disposed in the valve bore 32. A spring 41 is disposed in the cylinder 31 and always urges one end surf ace of the valve body 40 (lower end in FIG. 1) toward one side thereof (upper end in FIG. 1) to close a pair of relief grooves 34 which are formed in the valve cylinder 31 and open to an inner peripheral portion of the valve bore 32 for relieving the discharged oil into the return conduit 22b.

The valve body 40 slides in the valve bore 32 in response to discharged oil pressure of the oil pump 10 through the inlet bore 33 against the urging force of the spring 41. The valve body 40 maintains the discharged oil pressure at a predetermined pressure level by opening and closing the pair of relief grooves 34. Therefore the valve body 40 regulates the discharged oil pressure in the outlet conduit 21 discharged by the oil pump 10. Though FIG. 1 shows the valve cylinder 31 to be a separate member from the oil pump 10, it is also possible to integrate the valve cylinder 31 into a pump housing (not shown) and to dispose the relief conduits 22a and 22b in the pump housing.

The pair of grooves 34 are formed in the valve cylinder 31 symmetrically relatively to an axial center of the valve bore 32. In FIG. 2, the pair of relief grooves 34 of the first embodiment are shaped of a trapezoid in A—A section of FIG. 1 and formed by molding. Each relief groove 34 has an opening 34a having a central portion in the peripheral direction of the opening 34a which is concave toward the other side (lower side as shown in FIG. 2) of the valve body 40 in the axial direction. The periphery of the openings 34a of the relief grooves corresponds to the adjusting means of this invention.

According to the first embodiment, when the level of the discharged oil pressure of the oil pump 10 through the inlet bore 33 exceeds a predetermined value, the discharged oil pressure applied to the upper side of the valve body 40 makes the valve body 40 slide against the urging force of the spring 41.

The opening area of the openings 34 at the beginning of one slide movement of the valve body 40 is smaller than that at the end of the slide the movement. Therefore the relief valve 40 regulates the pressure of the discharged operation oil at the predetermined level without changing the pressure of the oil discharged through the openings rapidly.

The discharged oil does not urges the valve body against the inner peripheral of the valve bore. Accordingly, the above relief valve changes the discharged oil pressure in the valve bore 32 moderately to the level of the predetermined value and prevents the valve body 40 from vibration and generating undesired sound as well as an eccentric wearing due to the invasion of foreign materials between the pair of relief grooves 34 and the valve body 40. Since the pressure balance within the valve bore 32 can be kept at the opening operation.due to the symmetrically provided relief grooves 34, the pressure is equally applied to the valve body 40, which can prevent the eccentric wearing thereof.

Figure 3:
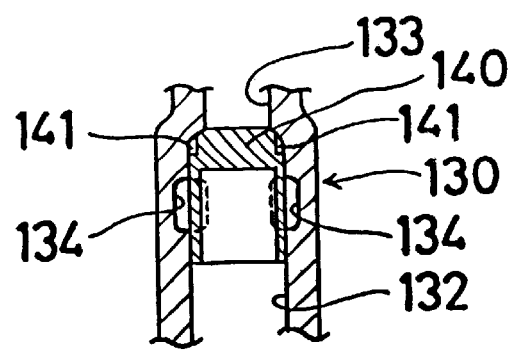
FIG. 3 shows a relief valve of a second embodiment of the present invention.
Figure 4:
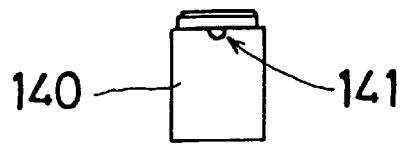
FIG. 4 shows a side view of the relief valve of the second embodiment.
Figure 5:
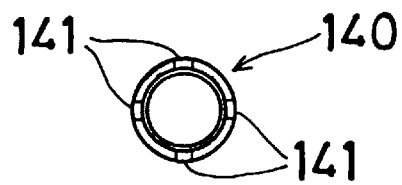
FIG. 5 shows a top view of the relief valve of FIG. 3.
Figure 6:
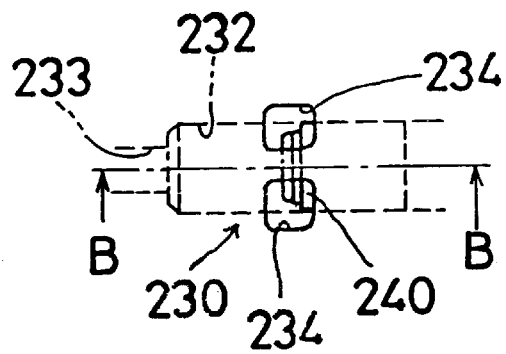
FIG. 6 shows a conventional relief valve of an oil pump.
Figure 7:
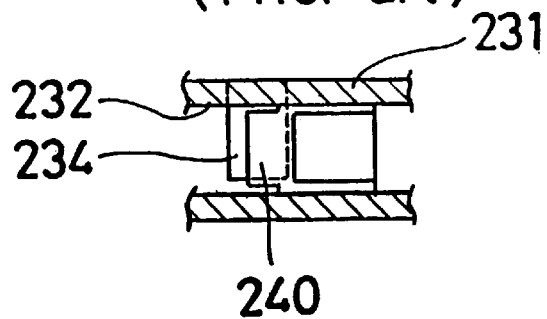
FIG. 7 shows another conventional relief valve of an oil pump.

The second embodiment of this invention described hereinafter referring to FIGS. 3 through 5. One end of the relief grooves 134 is formed perpendicular to a central axis of an valve bore 132 and extends in parallel with the one end surface of a valve body 140 located adjacent an inlet bore 133 as viewed in FIG. 3. The valve body 140 further comprises several slits 141 which are formed in the outer peripheral surface of the one end surface of the valve body 140 and disposed with an equal predetermined space and extending in parallel with the axial direction of the valve bore 132. The same structure as the first embodiment except the shape of the relief grooves and the provision of slits is used in the structure of the second embodiment and the detailed explanation will be omitted.

According to the above second embodiment, the plurality of slits 141 (corresponding to the adjusting means of this invention) are formed in the outer peripheral surface of the valve body 140 by equal predetermined space and extending in parallel with the axial direction of a valve bore 132, and accordingly a change rate of the opening area of the relief grooves 134 relatively to the slide movement of the valve body 140 becomes smaller at the beginning for the valve body 140 sliding within the valve bore 32 than that at the end of the movement. Because when the valve body 140 slides, the plurality slits 141 communicates the opening of the valve bore 132 first. Therefore the relief valve based on the second embodiment is able to reduce the change rate of the opening area of the relief bores effectively as that of the first embodiment.

What is claimed is:

1. A relief valve for regulating discharged oil pressure of an oil pump at a predetermined level, comprising:

a housing including a bore therein, and a pair of relief grooves formed in the housing so as to extend along a plane passing an axial center of the bore while separating from the plane with a predetermined space, each of said relief grooves has a respective opening to an inner peripheral portion of the bore;

a valve body disposed in the housing so as to be slidably moved in the bore in response to the discharged oil pressure supplied into the bore at one side of the valve body;

a spring provided in the other side of the valve body constantly urging the valve body toward the one side of the valve body so as to close the openings of the relief grooves by the valve body; and adjusting means for adjusting a change rate of an opening area of the relief grooves which open relatively to the slide movement of the valve body against the urging force of the spring so that the change rate at the beginning of one slide movement of the valve body is smaller than that at the end of the slide movement of the valve body.

2. A relief valve according to claim 1, wherein the adjusting means is formed by the openings of the grooves, each of the openings has a central portion in its peripheral direction extending toward the other side of the valve body in an axial direction.

3. A relief valve according to claim 1, wherein the adjusting means is a slit formed at an outer peripheral portion of the one side of the valve body.

4. A relief valve according to claim 1, wherein the adjusting means is a slit extending in parallel with the axial direction of the bore.

5. A relief valve for regulating discharged oil pressure of an oil pump at a predetermined level, comprising:

a cylinder including a bore therein, and relief grooves formed in the cylinder so as to extend through a portion of the bore in a peripheral direction of the bore, each of said relief grooves has a respective opening to an inner peripheral portion of the bore;

a valve body disposed in the cylinder so as to be slidably moved in the bore in response to the discharged oil pressure supplied into the bore at one side of the valve body;

a spring provided in the other side of the valve body constantly urging the valve body toward the one side of the valve body so as to close the openings of the relief grooves by the valve body; and adjusting means for adjusting a change rate of an opening area of the relief grooves which open relatively to the slide movement of the valve body against the urging force of the spring so that the change rate at the beginning of one slide movement of the valve body is smaller than that at the end of the slide movement of the valve body.

6. A relief valve according to claim 5, wherein the adjusting means is formed by the openings of the grooves, each of the openings has a central portion in its peripheral direction extending toward the other side of the valve body in an axial direction.

7. A relief valve according to claim 5, wherein the adjusting means is a slit formed at an outer peripheral portion of the one side of the valve body.

8. A relief valve according to claim 5, wherein the adjusting means is a slit extending in parallel with the axial direction of the bore.

9. A relief valve for regulating discharged oil pressure of an oil pump at a predetermined level, comprising:

a housing including a bore therein, and a pair of relief grooves formed in the housing so as to extend through a portion of the bore along a plane perpendicular to all axial center of the bore, said pair of relief grooves being spaced a predetermined distance from each other and from the axial center therebetween, and each of said relief grooves has a respective opening to an inner peripheral portion of the bore;

a valve body disposed in the housing so as to be slidably moved in the bore in response to the discharged oil pressure supplied into the bore at one side of the valve body;

a spring provided in the other side of the valve body constantly urging the valve body toward the one side of the valve body so as to close the openings of the relief grooves by the valve body; and adjusting means for adjusting a change rate of an opening area of the relief grooves which open relatively to the slide movement of the valve body against the urging force of the spring so that the change rate at the beginning of one slide movement of the valve body is smaller than that at the end of the slide movement of the valve body.

10. A relief valve according to claim 9, wherein the adjusting means is formed by the openings of the grooves, each of the openings has a central portion in its peripheral direction extending toward the other side of the valve body in an axial direction.

11. A relief valve according to claim 9, wherein the adjusting means is a slit formed at an outer peripheral portion of the one side of the valve body.

12. A relief valve according to claim 9, wherein the adjusting means is a slit extending in parallel with the axial direction of the bore.

* * * * *